United States Patent [19]
Dettinger et al.

[11] Patent Number: 5,152,186
[45] Date of Patent: Oct. 6, 1992

[54] GEARWHEEL FOR THE DRIVE OF OFFSET PRESS CYLINDERS

[75] Inventors: Dietrich Dettinger, Heusenstamm; Josef Mathes, Offenbach am Main, both of Fed. Rep. of Germany

[73] Assignee: MAN Roland Druckmaschinen, Fed. Rep. of Germany

[21] Appl. No.: 734,539

[22] Filed: Jul. 23, 1991

[30] Foreign Application Priority Data

Aug. 14, 1990 [DE] Fed. Rep. of Germany ....... 4025668

[51] Int. Cl.$^5$ ...................... F16H 55/04; F16H 55/18
[52] U.S. Cl. ......................................... 74/440; 74/409
[58] Field of Search ................. 74/409, 440; 475/183, 475/195

[56] References Cited

U.S. PATENT DOCUMENTS

| | | | |
|---|---|---|---|
| 3,296,881 | 1/1967 | Seabeck | 74/440 |
| 3,803,936 | 4/1974 | Kroeper | 74/440 X |
| 4,106,360 | 8/1978 | Manna | 74/440 |
| 4,241,619 | 12/1980 | Cerny et al. | 74/440 |
| 4,660,432 | 4/1987 | Damas | 74/440 |
| 4,805,475 | 2/1989 | Hannel | 74/440 |
| 5,025,894 | 6/1991 | Yamasaki | 74/440 X |

FOREIGN PATENT DOCUMENTS

| | | | |
|---|---|---|---|
| 721746 | 12/1952 | Fed. Rep. of Germany . | |
| 1650784 | 6/1972 | Fed. Rep. of Germany . | |
| 1650785 | 10/1976 | Fed. Rep. of Germany . | |
| 2829026 | 10/1981 | Fed. Rep. of Germany . | |
| 3834429 | 12/1989 | Fed. Rep. of Germany . | |
| 2-120553 | 5/1990 | Japan | 74/440 |
| 927741 | 6/1963 | United Kingdom | 74/409 |
| 956906 | 4/1964 | United Kingdom | 74/409 |

*Primary Examiner*—Leslie A. Braun
*Assistant Examiner*—Khoi Q. Ta
*Attorney, Agent, or Firm*—Leydig, Voit & Mayer

[57] ABSTRACT

A radially adjustable gearwheel for driving a cylinder of an offset press. The gear rim has a peripheral annular groove opening axially outward and dimensioned to receive a tensioning ring including inner and outer body parts engaging each other along an inclined tapered surface. A plurality of tensioning devices are mounted on the gear rim and act axially on the tensioning ring causing the inclined surfaces of the inner and outer body parts to slide against each other resulting in radial displacement of the outer body part which produces radial deformation of the gear rim.

2 Claims, 1 Drawing Sheet

GEARWHEEL FOR THE DRIVE OF OFFSET PRESS CYLINDERS

FIELD OF THE INVENTION

The present invention relates generally to gearwheels for the drive of offset press cylinders and more particularly concerns a device for reducing backlash and out-of-true running of the gearwheels.

BACKGROUND OF THE INVENTION

Offset printing presses require very close synchronization of their gear trains in order to obtain satisfactory prints. A small amount of backlash or out-of-true running is enough to affect the quality of the prints. To synchronize the gearwheels, it is known from the prior art that means can be provided for radially deforming a gear rim so that it properly meshes with the adjacent gearwheel.

For example, DE-PS 1 650 784 discloses two variants of tensioning means for subjecting the gear rim of the drive gear of an offset press cylinder to radial deformation. In one of these variants, the gearwheel can be subjected to radial deformation from the force of an axially adjustable wedge disposed in an axial bore in the rim of the gearwheel. Alternatively, a radially disposed adjustable screw can be located in an axial bore.

In another prior art arrangement, DE-PS 2 829 026 discloses a gear drive in which the helical spur gearwheels have a coaxial tensioning disk. As disclosed in this reference, each tensioning disk has two or more tensioning devices which act axially on the rim of the gearwheel and the elastic axial deformation of the helical gear rim is used to adjust the backlash. Here, however, the gear teeth are tilted somewhat during the axial deformation produced by the tensioning disk.

OBJECT AND SUMMARY OF THE INVENTION

It is the primary object of the invention to provide means for adjusting the backlash and smoothly correcting out-of-true running of the drive gear of offset press cylinders.

A more detailed object of the invention is to provide tensioning means for deforming the gear rim of a gearwheel whereby partial cylindrically spherical deformation and enlargement of the diameter of the gear rim is possible in a relatively simple matter.

To enable the gear rim of a gearwheel to be subjected to radial deformation, the gear rim of the present invention has an annular groove concentric with the gear and open to one side. A tensioning ring consisting of two body parts separated by an inner taper is pressed into the annular groove. A plurality of tensioning devices are disposed axially on the tensioning ring and, when tensioned, force one of the two body parts of the tensioning ring radially outward due to the action of the inner taper. Radial movement of the tensioning ring causes radial movement of the gear rim. Adjustments can be made until backlash and/or out-of-true running is eliminated.

The advantage of the present invention is that it allows for both partial deformation and to some extent a circular diameter increase of the gear rim. In addition, the slightly spherical expansion gives improved running accuracy.

These and other features and advantages of the invention will be more readily apparent upon reading the following description of a preferred exemplified embodiment of the invention and upon reference to the accompanying drawings wherein:

DETAILED DESCRIPTION OF THE PREFERRED EMBODIMENT

Figure 2:
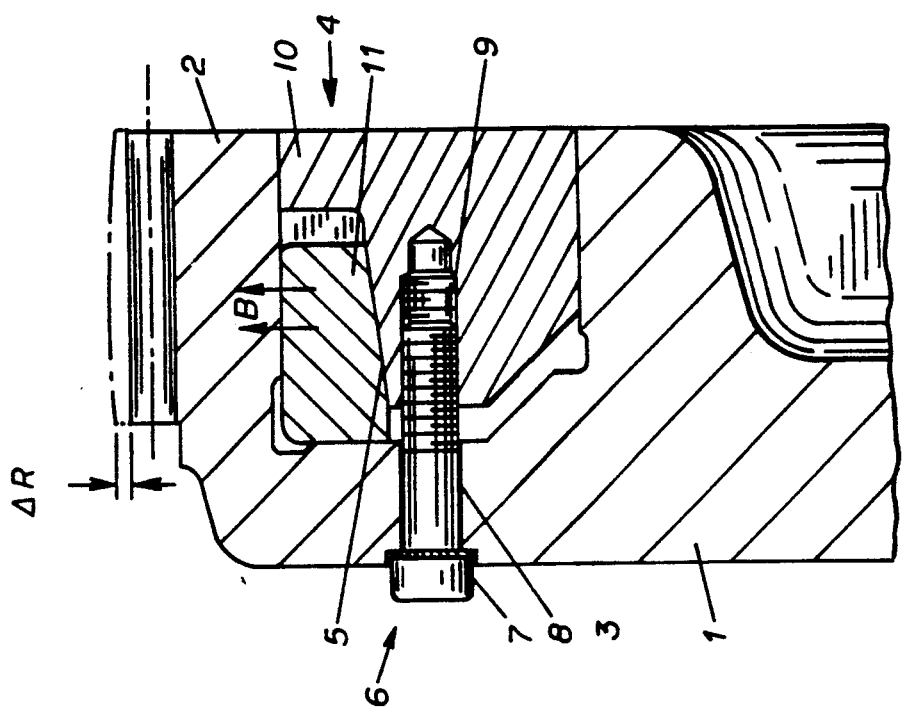
FIG. 2 is an enlarged and more detailed radial section through the gear rim of the gearwheel taken along line 2—2 in FIG. 1.
Figure 1:
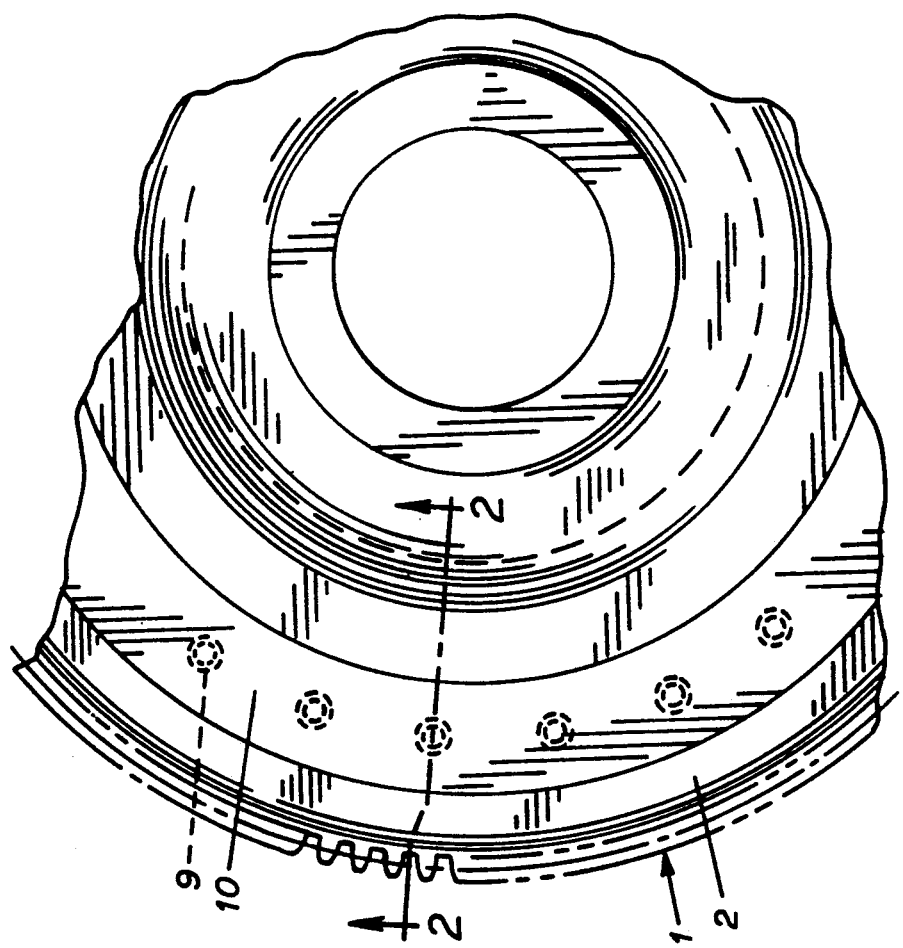
FIG. 1 is a partial and generally schematic plan view of a gearwheel according to the invention.

Turning now to the drawings, there is shown in FIGS. 1 and 2 a gearwheel 1 with a gear rim 2. According to the present invention, the gear rim 2 has a peripheral annular groove 3 which opens axially outward. A tensioning ring 4 is inserted coaxially of the gearwheel 1 in the annular groove 3, such ring being divided and comprising inner and outer body parts 10 and 11 engaging each other along an inclined tapered surface 5. A plurality of tensioning devices 6 are mounted on the gear rim 2 and act axially on the tensioning ring 4. Tightening these tensioning devices causes the inclined surfaces 5 of the inner and outer parts 10, 11 to slide against each other resulting in radial displacement of the outer part 11 which produces a substantially circular radial deformation of the gear rim 2.

An important feature of the invention is the ability to locally deform the gear rim 2. Since the tensioning devices 6 each can tension independently of one another, the deformation due to one tensioning device is substantially local. Thus, different sections of the gear rim can be deformed to different degrees.

Another important feature of the present invention is the ability to produce a slightly spherical deformation of the gear teeth. The spherical deformation takes place because the expanding outer part 11 contacts the gear rim 2 in the middle of the tooth width as illustrated by the arrows B in FIG. 2. This slightly spherical deformation improves the running accuracy of the gears.

In the preferred embodiment, each tensioning device 6 comprises a tensioning screw 7 situated axially and guided slidably in a bore 8 in the gear rim 2. The threaded end of the tensioning screw 7 co-operates with a tapped bore 9 in the inner body part 10 of the tensioning ring 4. The inner part 10 bears by cylindrical inner contours radially against the annular groove 3 and also via the inclined surface 5 against the outer body part 11. The outer body part 11 bears by its cylindrical outer contour radially against the annular groove 3.

From the foregoing, it will be understood that turning the tensioning screw 7 causes the inner part 10 to move axially and, due to sliding engagement with the inclined surface 5 of the outer part 11, produces an outward radial displacement of the outer part 11. This outward radial displacement produces a locally elastic radial deformation of the gearwheel 1 in conjunction with a spherical spreading ($\Delta R$) of the gear rim 2.

We claim as our invention:

1. A radially adjustable gearwheel for driving a cylinder of an offset press comprising, in combination, a gear rim with a peripheral annular groove opening axially outwardly, said gear rim provided with a plurality of axial bores, a tensioning ring including inner and outer body parts, said inner body part provided with a plurality of axial tapped bores, said inner and outer body parts engaging each other along an inclined tapered surface, said annular groove dimensioned to receive said tensioning ring, and a plurality of tensioning screws mounted on and rotating with the gearwheel, said tensioning screws extending axially in said bores in said gear rim and having threaded ends which cooperate with said tapped bores in said inner body part of said tensioning ring, said inclined surface of said inner body part moving axially against the inclined surfaces of said outer body part and forcing said outer body part radially outwardly generating a local elastic radial spherical deformation of the gearwheel when said tensioning screws are selectively screwed into said inner body part.

2. A gearwheel according to claim 1 wherein the gearwheel includes a plurality of peripheral gear teeth having a predetermined axial tooth width, and wherein the local elastic radial spherical deformation of the gearwheel is generated substantially in the middle of the tooth width.

* * * * *